United States Patent
Rochette et al.

(10) Patent No.: US 6,257,254 B1
(45) Date of Patent: Jul. 10, 2001

(54) CLEANING SYSTEM FOR A WASHER

(75) Inventors: Daniel Rochette, Charlesbourg; Michel Lemay, Ste-Foy; Yves-André Theriault, Beauport; Michel Emond, Lévis; Mario Duchaine, Beauport; Ghislain Parent, Cte-Lévis; Nathalie Thibault, Boischatel, all of (CA)

(73) Assignee: Steris Corporation, Mentor, OH (US)

( * ) Notice: Subject to any disclaimer, the term of this patent is extended or adjusted under 35 U.S.C. 154(b) by 0 days.

(21) Appl. No.: 08/970,406

(22) Filed: Nov. 14, 1997

(51) Int. Cl.$^7$ .................................................. B08B 3/02
(52) U.S. Cl. ...................... 134/105; 134/111; 134/113; 134/172; 134/198; 239/243
(58) Field of Search ..................... 134/111, 105, 134/113, 172, 173, 198, 57 D, 100.1, 123; 239/289, 239, 264, 215, 242, 243; 68/17 R, 207

(56) References Cited

U.S. PATENT DOCUMENTS

| | | | | |
|---|---|---|---|---|
| 3,018,922 | * | 1/1962 | Williamson | 68/17 R |
| 3,022,791 | * | 2/1962 | Larson | 134/123 |
| 3,044,285 | * | 7/1962 | Kuplin | 68/17 R |
| 3,096,775 | * | 7/1963 | Clarke et al. | 134/123 |
| 3,179,117 | * | 4/1965 | Gibson et al. | 134/123 |
| 3,258,019 | * | 6/1966 | Bellas et al. | 134/123 |
| 3,444,867 | * | 5/1969 | Thornton | 134/123 |
| 3,474,965 | * | 10/1969 | Coleman | 134/100.1 |
| 3,502,215 | * | 3/1970 | Cahan | 134/123 |
| 3,645,791 | * | 2/1972 | Sadwith | 134/25 A |
| 3,646,521 | | 2/1972 | Porter . | |
| 3,698,029 | * | 10/1972 | Pulliam | 134/123 |
| 3,736,948 | * | 6/1973 | Crosswhite | 134/123 |
| 3,771,333 | * | 11/1973 | Jurjans | 68/17 R |
| 3,804,297 | * | 4/1974 | Jurjans | 68/17 R |
| 4,135,533 | * | 1/1979 | Gall et al. | 134/123 |
| 4,147,559 | * | 4/1979 | Fraula et al. | 134/57 D |
| 4,235,421 | * | 11/1980 | Phillips | 254/386 |
| 4,300,986 | * | 11/1981 | Akira et al. | 134/172 |
| 4,378,705 | * | 4/1983 | Oka | 74/37 |
| 4,730,630 | * | 3/1988 | Ranft | 134/111 |
| 4,756,321 | * | 7/1988 | Livingston et al. | 134/56 D |
| 4,807,319 | * | 2/1989 | Poitevin | 134/123 |
| 4,845,965 | * | 7/1989 | Copeland et al. | 68/17 R |
| 4,932,227 | * | 6/1990 | Hogrefe | 68/17 R |
| 4,941,491 | | 7/1990 | Goerss et al. . | |
| 4,956,887 | * | 9/1990 | Hakulinen | 68/17 R |
| 5,129,411 | * | 7/1992 | Lagerstrand | 134/56 D |
| 5,132,013 | | 7/1992 | Thompson | 210/448 |
| 5,133,375 | * | 7/1992 | Schinzing et al. | 134/123 |
| 5,137,041 | * | 8/1992 | Hall | 134/57 D |

(List continued on next page.)

FOREIGN PATENT DOCUMENTS

| | | |
|---|---|---|
| 700 302 | 12/1940 | (DE) . |
| 835 822 | 4/1952 | (DE) . |
| 88 16 334 U | 10/1989 | (DE) . |
| 42 39 259 | 5/1994 | (DE) . |
| 2 695 329 | 3/1994 | (FR) . |

*Primary Examiner*—Frankie L. Stinson
(74) *Attorney, Agent, or Firm*—Fay, Sharpe, Fagan, Minnich & McKee, LLP (57) ABSTRACT

A high pressure pump (14) supplies cleaning fluid from a reservoir (12) to spray nozzles (20) inside a washing chamber (10). The spray nozzles (20) spray the cleaning fluid over a load to be cleaned. Used cleaning fluid is collected in a sump (30). A sump pump (32) drains the sump. The combination of the high pressure pump and sump pump provides more efficient cleaning of the load and eliminates the requirement for a deep sump beneath the washer. A vertical traveler (22), having a pair of counterbalanced spray arms (24), raises and lowers the spray nozzles counter cyclically; a detergent injection system (50) accurately meters a correct amount of detergent is added to the cleaning fluid; and a filtration device (34) filters suspended material from the used cleaning fluid and uses a portion of the cleaning fluid to clean itself.

24 Claims, 5 Drawing Sheets

U.S. PATENT DOCUMENTS

| | | | | |
|---|---|---|---|---|
| 5,164,106 | * | 11/1992 | Ahmed et al. | 252/104 |
| 5,195,338 | * | 3/1993 | Russo | 68/17 R |
| 5,208,930 | * | 5/1993 | Chabard | 68/17 R |
| 5,246,023 | * | 9/1993 | Breunsbach et al. | 134/57 R |
| 5,280,855 | * | 1/1994 | Rietsch | 239/264 |
| 5,401,328 | * | 3/1995 | Schmitz | 134/58 R |
| 5,417,233 | * | 5/1995 | Thomas et al. | 68/17 R |
| 5,453,245 | * | 9/1995 | Kirschner et al. | 134/100.1 |
| 5,472,604 | | 12/1995 | Yang | 210/409 |
| 5,500,050 | * | 3/1996 | Chan et al. | 134/18 |
| 5,564,595 | * | 10/1996 | Minissian | 68/17 R |
| 5,762,080 | * | 6/1998 | Edwards et al. | 134/58 D |
| 5,816,273 | * | 10/1998 | Milocco et al. | 134/108 |
| 5,820,689 | * | 10/1998 | Tseng et al. | 134/3 |
| 5,839,454 | * | 11/1998 | Matz | 134/57 D |

* cited by examiner

CLEANING SYSTEM FOR A WASHER

BACKGROUND OF THE INVENTION

The present invention relates to the cleaning and disinfecting arts. It finds particular application in conjunction with the cleaning of animal cages and racks and also healthcare and scientific equipment, such as hospital beds, wheelchairs, utensils, carts and instrument containers, and will be described with particular reference thereto. It should be appreciated, however, that the invention is also applicable to the cleaning and disinfecting of other pieces of equipment, particularly those which have been in contact with biological wastes.

Items such as animal cages and associated racks and large pieces of healthcare and scientific equipment are generally cleaned at frequent intervals to remove biological waste, such as urine, feces, and uneaten food. Thorough cleaning aids in preventing the spread of disease and reduces the development of unpleasant odors. Washers have been developed to handle the large scale cleaning and disinfecting of animal such items. Typically, these are large enough for a load to be processed to be wheeled manually into the washer. Cleaning fluid is then sprayed through jets onto the load. The used fluid is collected in a pit or sump, below the washer. The fluid is either recycled or discarded, depending on the degree of contamination.

When large numbers of items are to be cleaned, the cycle time of the machine is an important factor. A washer for items such as cages is necessarily a large and invariably a costly investment, and it is thus desirable for a facility to clean all such items in a single washer. Typically, the jets which are used to spray cleaning fluid over the load operate at around 20 p.s.i. (1.4 bar). Stripping the often dried and adherent biological matter from the load with fluid at this pressure is time consuming and cleaning cycle times of 40 minutes or longer are common. In addition, low pressure washing uses large quantities of cleaning fluid to compensate for the low level of impingement of the sprays upon the process load.

The length and effectiveness of the cleaning system are also dependent on the arrangement of the jets within the washer. Cages and racks and scientific and healthcare equipment and racks are often large, with components which inhibit movement of the cleaning fluid, resulting in incomplete cleaning of the load. A number of systems have developed for directing the sprays of cleaning fluid so as to improve coverage of the load. In one system, a rotary spray arm is used. The pressure of the cleaning fluid causes the arm to rotate. Holes in the spray arm spray the fluid into the washer. The effectiveness of cleaning, however, is reduced because the sprays emitted tend to fight against each other, reducing the power of the sprays and varying their direction. Some of the energy of the spray is utilized in rotating the spray arm, reducing the water pressure efficiency of the spray. It is also difficult to ensure coverage of the entire load with a rotating spray arm. Further, the soil washed from the load tends to be pushed toward the center of the washer, collecting on parts of the load, rather than dripping off the load and into the sump.

In another cleaning system, a tube supplies cleaning fluid to two spray bars or arms, movably mounted on either side of the washing chamber. The bars move simultaneously up the side of the washer, spraying fluid from nozzles as they travel. The sprays provide coverage of the entire washer, and increase cleaning efficiency through the effect of fluid dripping through the load. The system generally includes a complicated movement mechanism. A safety clutch is therefore provided to reduce the danger to workers in the event that the mechanism fails to operate properly. The sprays from the two spray bars tend to fight against each other. In a similar cleaning system, spray arms travel horizontally, rather than vertically. In addition to having some of the problems associated with the vertical cleaning system, the sprays tend to push the soil into the center of the load, resulting in less efficient cleaning.

There remains a need for a cleaning system with a reduced cycle time that strips the biological matter from the load and sanitizes the load more effectively.

Effective cleaning of the load is also achieved by maintaining the concentration of a selected detergent in the cleaning fluid. Because of the often high cost of the detergent, and the large quantities of cleaning fluid employed, it is desirable to maintain the detergent concentration close to the minimum level required to insure effective cleaning. Traditionally, the cleaning fluids are pumped in solution from storage tanks. Periodically, the fluid in the tank is replenished by the separate addition of detergent, in concentrated form, and water.

Measuring the actual concentration of the detergent in the tank is time consuming, therefore methods have developed which determine the concentration indirectly. Typically, one of two methods is used to estimate the concentration of detergent. In the first method, the addition of detergent to the tank from a detergent supply container is timed. The concentration of detergent is inferred from the operating time of a pump used to transfer the detergent. This provides a simple means of determining detergent concentration. However, if there is little or no detergent passing through the pump, which could occur, for example, if the pump is not working properly, then inaccurate measurements of detergent concentrations are obtained. Inadequate cleaning and sanitization of the process load results when the detergent concentration drops below a minimum level.

In the second method, the detergent concentration is inferred from a measure of the pH or conductivity of the cleaning solution. This correlates well with the detergent concentration in the fresh cleaning fluid. It is usual, however, to recycle a portion of the cleaning fluid from the washer into the tank for reuse. The recycled cleaning fluid contains soil from the load which influences the pH and conductivity of the cleaning fluid. Thus, the measure of pH or conductivity gives an inaccurate determination of the concentration of detergent in the tank, the inaccuracy becoming more pronounced at higher soil concentrations. There remains a need for a cleaning system that insures effective cleaning by providing a more accurate method of monitoring the rate of addition of detergent.

The cleaning fluid is generally retained in the sump. The cleaning fluid is pumped from the sump by a sump pump and circulated to the nozzles in the washing chamber. The fluid level in the sump must remain deep enough that the sump pump does not cavitate. Conventionally, cage and rack washers employ sumps of around 30–40 cm deep to supply the necessary depth of fluid for operation of a typical sump pump. To provide this depth, a large well is usually constructed through the floor beneath the washer, with suitable reinforcement for the washer. Constructing such a well within a concrete floor is frequently expensive and time consuming. In some floor structures, there is insufficient below ground depth available for the sump and the load is raised well above floor level to enter the washer. Ramps provide a means of raising the load, but as cages and hospital and scientific equipment are frequently heavy, it is difficult to push them up a ramp that is too steep. Shallow ramps make loading the washer easier but take up considerable space and are hazardous if wheeled carts are left unattended and accelerate down the slope.

Typically, a portion of the cleaning fluid is returned to the tanks for recycling after it has been used in the washer. Generally, sump pumps do not begin to operate until a sufficient head of fluid has collected in the sump. Thus, there is a delay between cycles while a portion of the used cleaning solution is discarded and replaced with fresh water and added detergent. In addition, because of the different soils encountered, cleaning systems typically include two or more cycles, each using a different cleaning fluid. Separate tanks are used for each of the cleaning fluids. To avoid mixing of the different fluids, the contents of the sump are pumped to the tanks between cycles. There is a considerable time lag between cycles as the pump completes the removal of the collected fluid from the sump. Moreover, the pump ceases to operate once the fluid drops below the cavitation level and the remaining fluid is simply drained to the waste system. Draining of the sump in this way takes considerable time, and also increases operating costs through higher detergent use and costs of treating the waste to meet environmental standards.

The fluid collecting in the sump is typically heated by a steam coil, located in the sump, to maintain the temperature of the fluid during cycles. Because of heat losses from the sump compounded by the length of time spent by fluid in the sump, considerable wastage of energy occurs. In addition, the fluid in the sump is heated to a higher temperature than that employed in the washer to compensate for cooling. The hot soil-contaminated cleaning fluid and steam coil pose a danger to workers entering the washer between cycles, if they should accidentally fall into the sump. There exists a need for a cage washer that operates without a deep sump and that allows rapid removal of the used cleaning fluids from the sump. There also exists a need for a cleaning system which minimizes heat losses from the cleaning fluid.

Because of the cost of detergents, it is beneficial to reuse as much of the cleaning fluid as possible. Traditionally, a filter system removes solid matter from the used cleaning fluid before the fluid is returned to the fluid tank which filter becomes clogged with the solid material. The solid material clogging the filter reduces the wash pressure and efficiency of cleaning. Periodic down-time for manual cleaning of the filter is, therefore, encountered. This filter cleaning time limits the operating period of the washer, reducing the number of loads processed in a given time. There is a need for a filter system which operates continuously, flushing the build up of solid material from the filter without the need for frequent cleaning of the filter.

The present invention provides a new and improved washer with an improved cleaning system which overcomes the above referenced problems and others.

SUMMARY OF THE INVENTION

In accordance with one aspect of the present invention, a washer is provided. The washer includes a washing chamber, with spray nozzles disposed in the washing chamber for spraying a cleaning fluid over a load to be cleaned. A sump at the bottom of the washing chamber collects the cleaning fluid sprayed over the load. A sump pump removes cleaning fluid from the sump. A high pressure pump pumps cleaning fluid from a cleaning fluid reservoir to the spray nozzles.

In accordance with another aspect of the present invention, a washer is provided. Spray nozzles disposed within a washing chamber spray a cleaning fluid into the chamber. A pump pumps cleaning fluid to the spray nozzles from a cleaning fluid reservoir. A vertical traveler includes first and second counterbalanced spray arms, disposed adjacent opposite sides of the washing chamber, the spray nozzles disposed on the spray arms. The traveler also includes a mechanism which supports the spray arms for vertical travel and a drive system which alternately raises and lowers the spray arms, the first spray arm traveling in an opposite vertical direction to the second spray arm.

In accordance with yet another aspect of the present invention a washer is provided. Spray nozzles disposed in a washing chamber spray a cleaning fluid over a load to be cleaned. A pump which pumps cleaning fluid from a cleaning fluid reservoir to the spray nozzles. A filtration device removes suspended material from the cleaning fluid. The device includes a fluid inlet which receives cleaning fluid and a first fluid outlet which directs unfiltered cleaning fluid from the filtration device to a drain. The device also includes a valve which selectively closes to prevent cleaning fluid from exiting the filtration device through the first fluid outlet. The device further includes a filtration screen which filters suspended material from the cleaning fluid and a second fluid outlet through which filtered cleaning fluid leaves the device.

In accordance with another aspect of the present invention a fluid injection system for insuring accurate delivery of a preselected quantity of a fluid is provided. A peristaltic pump delivers the fluid, the preselected quantity of fluid measured in terms of a number of pulses of fluid delivered by the pump. A flow meter indicates whether fluid is flowing through the pump, the flow meter detecting a flow of fluid in the fluid injection system.

In accordance with another aspect of the present invention, a method for cleaning large equipment is provided. The method includes supplying spray nozzles with a cleaning fluid at a high pressure and spraying the cleaning fluid from the spray nozzles over a load of equipment. The method further includes collecting sprayed cleaning fluid in a sump and draining the cleaning fluid from the sump with a sump pump.

In accordance with another aspect of the present invention, a cleaning system is provided. The system includes supplying spray nozzles with a cleaning fluid and spraying the cleaning fluid from the spray nozzles over a load to be cleaned. The method also includes sequentially raising and lowering the spray nozzles with a vertical traveler. The sequence includes raising a first set of the spray nozzles at the same time as lowering a second set of the spray nozzles. The sequence further includes lowering the first set of the spray nozzles at the same time as raising the second set of the spray nozzles.

In accordance with another aspect of the present invention, a cleaning system is provided. The system includes supplying spray nozzles with a cleaning fluid at a high pressure, spraying the cleaning fluid from the spray nozzles over a load to be cleaned and collecting sprayed cleaning fluid. The system also includes closing a filtration valve connected to a first outlet on a filtration device and passing the sprayed cleaning fluid into the filtration device. The system further includes filtering suspended material from the sprayed cleaning fluid and passing the filtered cleaning fluid from the filtration device through a second outlet. Still further, the method includes selectively opening the filtration valve and allowing a portion of the sprayed fluid to pass through the first outlet and through the open filtration valve to remove suspended material trapped within the filtration device.

One advantage of the present invention is that the cycle time for the washer is considerably reduced over conventional systems.

Another advantage of the present invention is that it enables optimal detergent concentrations to be maintained with minimal detergent additions.

Yet another advantage of the present invention resides in its effective cleaning, with lower volumes of cleaning fluid.

Still further advantages reside in the shallow depth of the sump, simple installation, and the low volume of cleaning fluid remaining therein between cycles.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
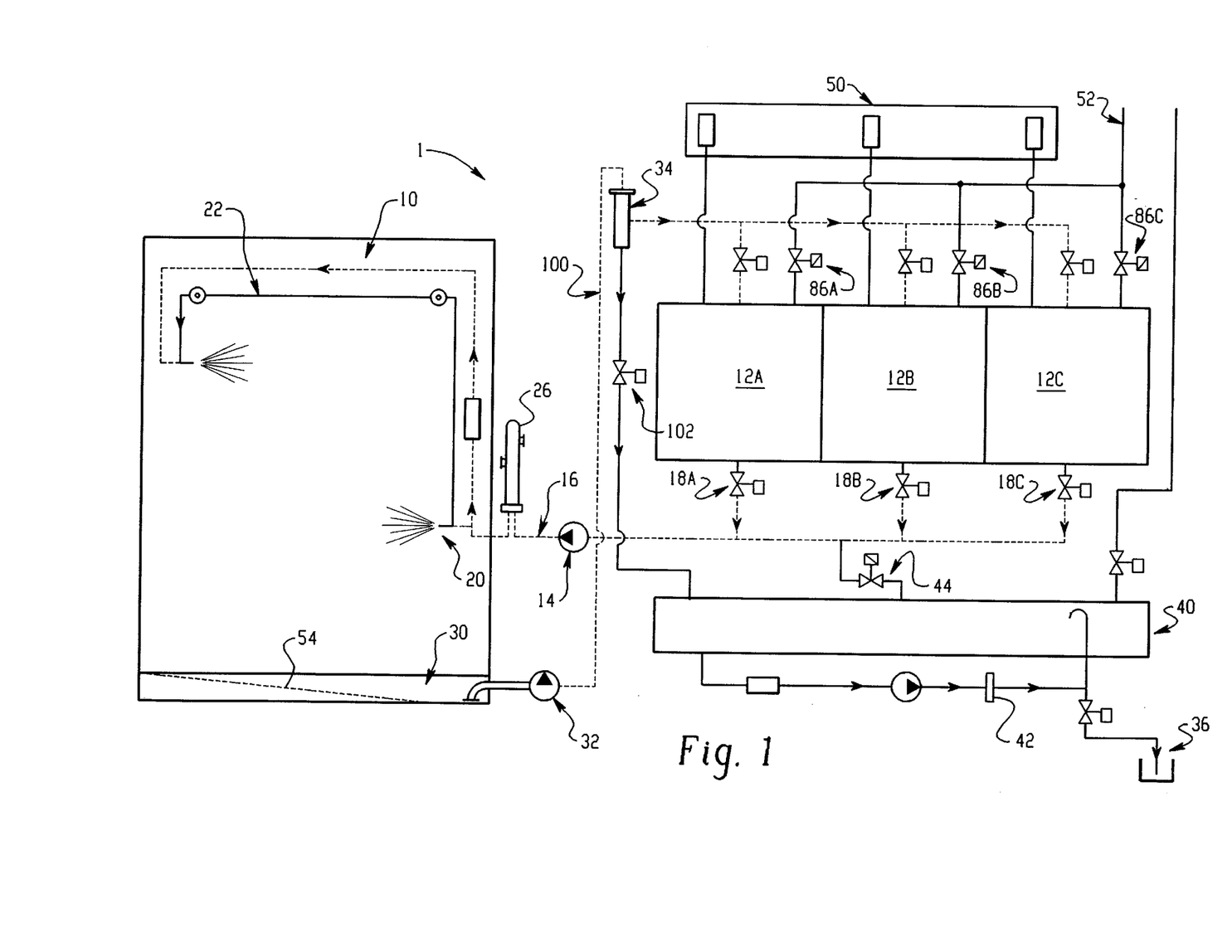
FIG. 1 is a schematic of a preferred embodiment of a cleaning system for a washer according to the present invention.

With reference to FIG. 1, a load to be cleaned is wheeled into a washer 1, which includes a washing chamber 10, and washer doors (not shown) are closed. A source of cleaning fluid, such as a cleaning fluid reservoir or tank 12, supplies cleaning fluid to a pump, preferably a high pressure pump 14, through a fluid line 16. Optionally, plurality of tanks 12A, 12B and 12C each carry a different cleaning or rinse solution. Valves 18A, 18B and 18C are connected to cleaning fluid tanks 12A, 12B and 12C, respectively, for selectively delivering cleaning fluid to the fluid line 16. The high pressure pump 14 pumps the cleaning fluid at a pressure of between 5 and 15 bar, preferably around 7 to 9 bar, to spray nozzles 20 in the washer chamber.

Figure 2:
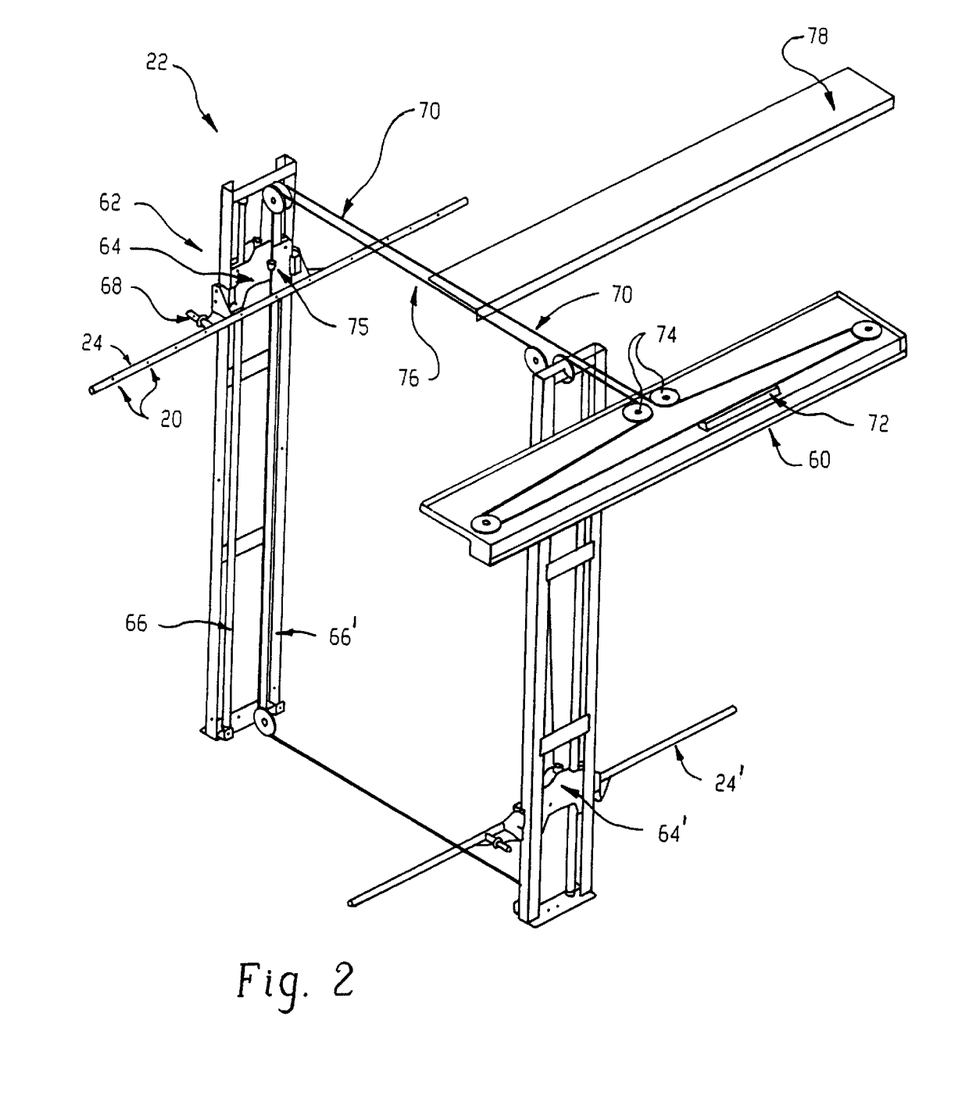
FIG. 2 illustrates an expanded, perspective illustration of the vertical traveler of FIG. 1.

With continuing reference to FIG. 1 and further reference to FIG. 2, a vertical spray traveler 22 supports spray arms or bars 24, disposed inside the washing chamber 10, each spray arm carrying a number of the spray nozzles 20. The high pressure pump 14 supplies the spray nozzles with cleaning fluid. An in-line temperature booster or heater 26 raises the temperature of the cleaning fluid to a preselected washing temperature before the fluid reaches the spray nozzles. The spray nozzles spray the cleaning fluid over the load to be cleaned. Depending on the nature of the load to be cleaned, several wash cycles are employed. A typical cleaning process includes a pre-wash, first detergent wash, mid-rinse, second detergent wash and final rinses. The load is then dried in the conventional manner.

A shallow sump 30 is located beneath the washing chamber 10 and collects the used fluid as it drips down from the washing chamber. A sump pump 32, preferably a self-priming pump, sits in the sump. The sump pump directs the used cleaning fluid to a vertical filtration device, or filter 34 and the tanks 12 or to a drain 36. Depending on the level of soil in the used fluid, the fluid is either reused or disposed of. If the fluid is to be reused, used fluid from the vertical filtration device is directed to the fluid tank. If the fluid is to be disposed, the fluid is directed to the drain. Fluid directed to the drain flushes solids from the vertical filtration device.

Preferably, before disposal, the fluid passes through a cool down vessel 40 where the temperature and pH of the fluid are adjusted to meet environmental standards. Preferably, a pH probe 42 monitors the pH of the used fluid in the vessel. The pH of the fluid is adjusted to the regulatory standard by the addition of acid or alkali, as required.

Figure 3:
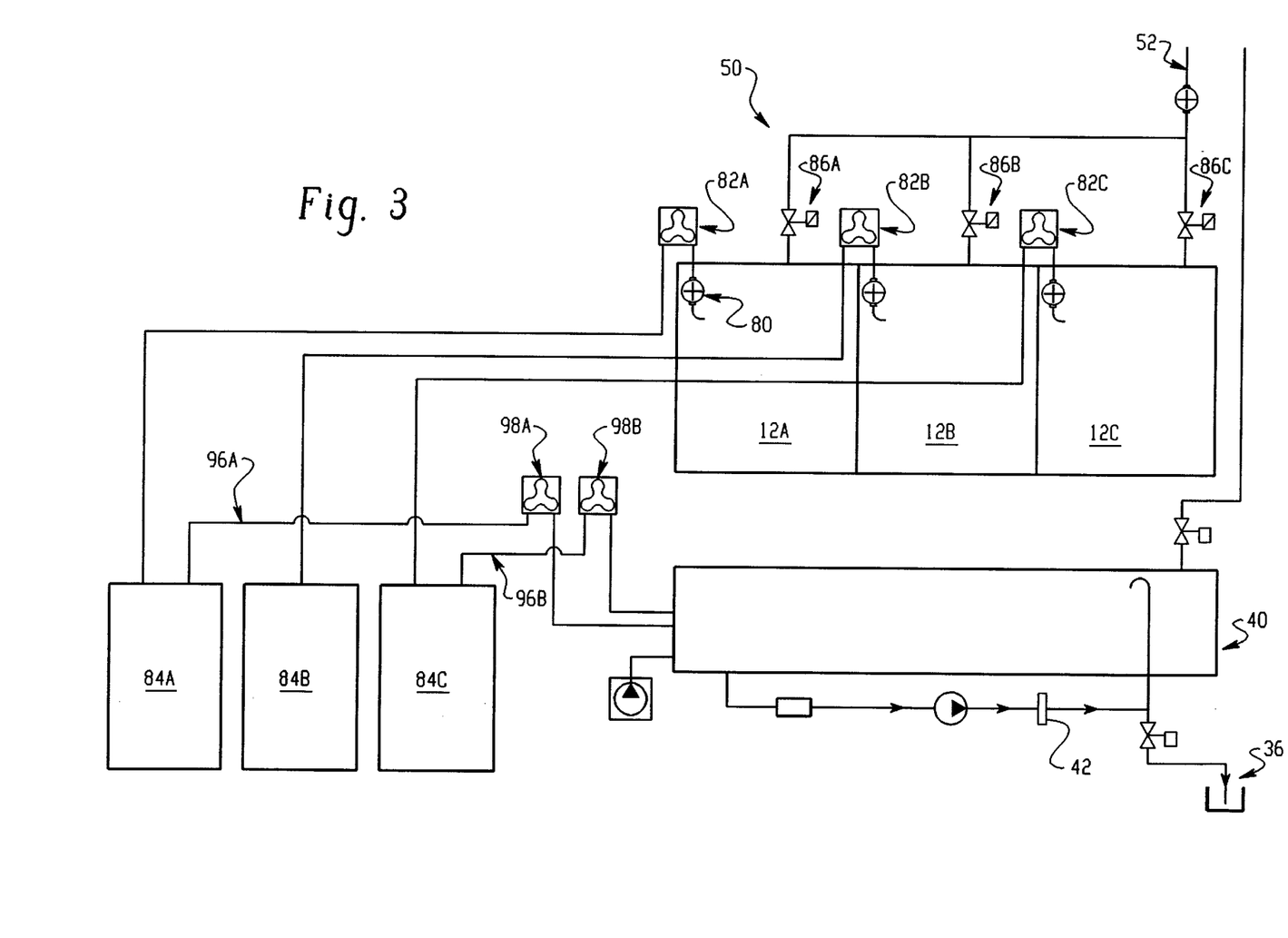
FIG. 3 is a schematic of a detergent supply system in accordance with the present invention.

With continuing reference to FIG. 1 and further reference to FIG. 3, a detergent flow metering system 50 periodically supplies fresh concentrated cleaning fluid to the tanks 12 to maintain cleaning fluid levels. A water inlet 52 supplies water to tanks 12 to dilute the incoming concentrated fluid. Preferably the water entering through inlet 52 is hot water. This raises the overall temperature of the cleaning fluid in the tanks and allows the in-line heater 26 to bring the temperature of the cleaning fluid rapidly up to the required wash temperature.

The lower pressure sump pump 32 and the higher pressure pump 14 provide both a high pressure wash and also allow for the sump 30 to be small. The high pressure pump provides high pressure cleaning fluid to the nozzles 20, relieving the sump pump of the task of pressurizing the fluid in the system. In the preferred embodiment, the sump pump transfers fluid from the sump to the tanks 12 or to the drain 36. A small sump pump is adequate for this task. The depth of the sump is reduced by using a self priming sump pump 32 which operates at the low fluid levels. A sump 30 of around 10–12 cm provides an adequate fluid depth for the self priming pump.

A washing system with a shallow sump offers a number of advantages over conventional systems. First, construction costs are reduced because the size of the area to be excavated is much smaller, and the extent of support is much less. Alternatively, the pit can be eliminated altogether by constructing the sump above ground. Long, shallow ramps (not shown) between floor level and the floor level of the washing chamber 10 readily allow heavy loads to be wheeled into and out of the washing chamber 10.

Further advantages of the shallow sump 30 arise because cleaning fluid does not accumulate in the sump. The sump pump 32 is designed to operate at low fluid levels and, in the preferred embodiment, operates fairly continuously to remove fluid as it drains into the sump from the washing chamber 10. This reduces the cycle time of the washer 1 because there is little fluid in the sump to be removed between cycles. A cycle time of around 15 minutes is preferably achieved. In addition, because it operates at lower fluid levels than a conventional washer sump pump, the sump pump is able to remove virtually all the fluid in the sump. This reduces the amount of cleaning fluid which is wasted, cutting the costs of detergent, water and environmental compliance in operating the washer.

Preferably the sump 30 has a sloping floor 54 which further reduces the quantity of fluid in the sump.

The shallow sump 30 and in-line temperature booster 26 cooperate to provide further advantages of the washer. Conventional washers which use a steam coil located within the sump, have high heat losses. In the preferred embodiment of the present invention, the shallow sump does not hold fluid for long periods. The sump pump 32 rapidly returns the cleaning fluid to the cleaning fluid tanks 12, which are preferably insulated to reduce heat loss, or directs the fluid to the drain 36. Thus, heat loss from the sump is minimized. This allows the steam coil to be eliminated. The in-line temperature booster heats the fluid more efficiently than would a sump steam coil by heating the cleaning fluid just prior to its entry into the washing chamber 10.

The high pressure pump 14 and vertical traveler 22 combine to provide an efficient system of cleaning cages and racks and other scientific and healthcare equipment by reducing the length of the cleaning cycle and reducing the volume of cleaning fluid circulating through the washing chamber 10 in the cycle. The high pressure pump, preferably constructed of a high grade stainless steel, supplies cleaning fluid at a pressure at least three to five times higher than in conventional cage cleaning systems. A pressure of around 7–9 bar at the nozzles (around 9–10 bar at the pump) is readily achieved in the preferred embodiment. Fluid at this pressure removes soil from the load to be cleaned more effectively than in conventional washers, thereby reducing the length of the cleaning cycle. The range of the spray from each of the nozzles 20 is also increased, improving the cleaning efficacy of less accessible portions of the load.

Varying the shape and number of the nozzles 20 on each spray arm 24 also influences the impact of the spray. In the preferred embodiment, 32 V-shaped nozzles provide good impingement and cleaning efficiency, although it is envisaged that the number and shape of the nozzles could be adjusted, dependent on the nature of the load and the pumping equipment used.

In the preferred embodiment, the flow rate is reduced to around 250 l/min, as compared with 740 l/min in a conventional system. Even at the reduced flow rate, the wash impingement is considerably higher than in conventional systems, because of the higher pressures used. Approximately 200% higher impingement is generated, at a distance of 30 cm from the nozzles, for the combination of flow rate, pressure, and nozzle dimensions recited. A reduced flow rate allows for smaller equipment. Tubes, valves and pumps are all smaller than in conventional high flow systems. The reduced flow rate also cuts operating costs in terms of energy use by pumps and heaters, detergent quantities, water consumption and fluid disposal.

With particular reference to FIG. 2, the alternating vertical traveler 22 includes two counterbalanced spray arms 24, 24' one disposed on either side of the washing chamber 10. Like parts associated with the two spray arms are similarly followed by a prime ('). The spray arms move up and down in opposite directions; as the first spray arm 24 moves downward, the second spray arm 24' moves upward. Nozzles 20, optionally holes formed in the spray arms, spray cleaning solution generally toward the center of the washing chamber. Thus, as the first spray arm is spraying the portion of the load closest to the top of the washing chamber, the second spray arm is simultaneously spraying the bottom of the load, close to the floor level. Cleaning fluid also flows down from the top of the load and additional nozzles (not shown) on the top of the washing chamber, aiding in the cleaning of lower portions, which typically include the heaviest soiled areas of cages. As the spray arms move toward the mid point of their travel, the sprays of cleaning fluid cross. For all but the crossing point, the spray arms spray independently, impinging on separate portions of the load. The load is first sprayed from one side and then the other. Therefore, the efficiency of the spray system is maximized and thorough cleaning of the entire load is achieved rapidly.

The traveler 22 preferably includes a drive system 60 for vertical countercyclical movement of the spray arms 24 and 24', and a mechanism 62 for supporting the spray arms 24 in such a way that the travel of each spray arm is limited to vertical movement in a plane approximately parallel to sides of the washing chamber 10. It is to be understood, however, that the invention is not limited to the drive system and mechanism described herein, but that other means conventionally known in the art for alternatively raising and lowering the two spray arms are also contemplated.

The mechanism 62 preferably includes a pair of followers 64 and 64' each of which holds one of the spray arms 24 so that it extends approximately horizontally on either side. Specifically, the two followers are slidably mounted in a pair of vertical tracks or rods 66 and 66' with the spray arms situated toward the center of the washing chamber 10.

Spray arms 24 include hose attachments 68. Flexible U-shaped hoses (not shown), connect to the hose attachments to supply cleaning fluid. The U-shaped hoses are fed from supply line 16. The spray arms and mechanism 62 are preferably constructed of materials that withstand the chemical cleaning environment and high-temperature drying commonly used.

In the preferred embodiment, the drive system 60 includes a drive cable or belt 70 connected with both followers 64. A drive means 72, such as a rodless pneumatic cylinder or alternating chain and sprocket system, engages the drive cable. The drive means is preferably housed outside the washing chamber 10, or is isolated from the sprays of cleaning fluid, so that it is not subject to damage by the cleaning fluids used in the washer 1.

The drive cable 70 forms a closed loop which passes from the drive means 72 to the first follower 64 and then to the second follower 64' before returning to the drive means. A guide system, such as a series of pulley wheels 74, positions the drive cable 62 so that the drive cable does not interfere with the operation of the spray arms 24 or the load to be processed. The drive means 72 draws the drive cable 70 a preselected distance in one direction then allows the drive cable to return, or draws the drive cable, the same distance in the reverse direction. In this way, the spray arms are moved simultaneously, one traveling upward, while the other travels downward. Because the spray arms and followers are counterbalanced, there is little tension on the drive means 72. The life expectancy of the drive means is much longer than in a conventional spray system. In addition, it is easier to detect jams and obstructions in the washing chamber 10 than for a conventional system because any impediment to movement of the spray arms is detected by the drive system and the movement of the spray arms is arrested. Alternatively, a break away system 75 releases the cable from the mechanism 62 or from the drive means. As an additional safety precaution, the mechanism is sized and configured so as to be easily grasped by an operator within the washing chamber without damage to the operators hand. By pulling on one of the spray arms, the movement of the drive cable 70 is arrested. This safety feature eliminates the need for a safety clutch, as commonly used in moving mechanical spray systems. Optionally, the speed of the drive means is variable, causing the spray arms to travel up and down at a preselected rate.

Preferably, a security cable 76 links the followers 64 and 64'. The security cable protects workers operating inside the washing chamber 10 by preventing the followers and attached spray arms 24 from falling in the event of a malfunction of the drive system 60. As an additional safety feature, a safety cover 78 covers at least part of the drive cable 70 to protect workers from injury by the cable.

With reference to FIGS. 1 and 3, the detergent injection system 50 regulates the amount of detergent or other cleaning or rinsing fluid introduced to the cleaning fluid tanks 12, insuring that the preselected amount has been added. In a typical cycle, the cleaning fluid is replenished at intervals by discarding a certain portion of the cleaning fluid that has circulated through the washing chamber 10, and refilling the cleaning fluid tank with fresh detergent. The proportion of the cleaning fluid to be discarded is determined by evaluations of the level of soil on the load to be processed. Typically, for lightly soiled loads, such as rodent cages, about 10% of the cleaning fluid is discarded after each load, while for heavily soiled loads, such as primate cages, a much larger proportion is discarded, up to 100%, typically, for the most heavily soiled loads. After a preselected number of cleaning cycles, the contents of the tanks 12 are completely drained and refilled with fresh cleaning fluid. In this way, effective cleaning of the process load is obtained, and detergent costs are minimized.

The detergent injection system 50 includes flow meter 80 and a metering pump, such as a peristaltic pump 82, for each cleaning fluid tank 12. A supply of detergent, such as supply containers 84, supplies detergent, or other selected cleaning fluids, to the cleaning fluid tanks for replenishing the tanks. The peristaltic pump pumps the detergent from the supply container to the cleaning fluid tank. In the embodiment shown in FIG. 3, three supply containers, 84A, B and C, contain an alkaline detergent, a rinse aid, and an acid detergent, respectively. The three supply containers supply corresponding cleaning fluid tanks 12A, B and C, respectively, although it is envisaged that combinations of detergent could be supplied to a single tank.

Detergent is metered into the cleaning fluid tank 12 by peristaltic pump 82. As the peristaltic pump rotates it delivers predetermined volume pulses of detergent into the cleaning fluid tank. The amount of detergent added is proportional to the number of these detergent pulses. Although a peristaltic pump 82 is the preferred means of delivering detergent, alternatively, a conventional pump supplies detergent to the tank, the detergent addition measured in terms of the operating time of the pump.

Where the detergent is added to the tank 12 in concentrated form, water is also added to the tank through inlet line 52 to dilute the detergent to the desired concentration within the tank. A series of valves 86A, B and C optionally allow for the separate addition to tanks 12A, B, and C respectively.

Figure 4:
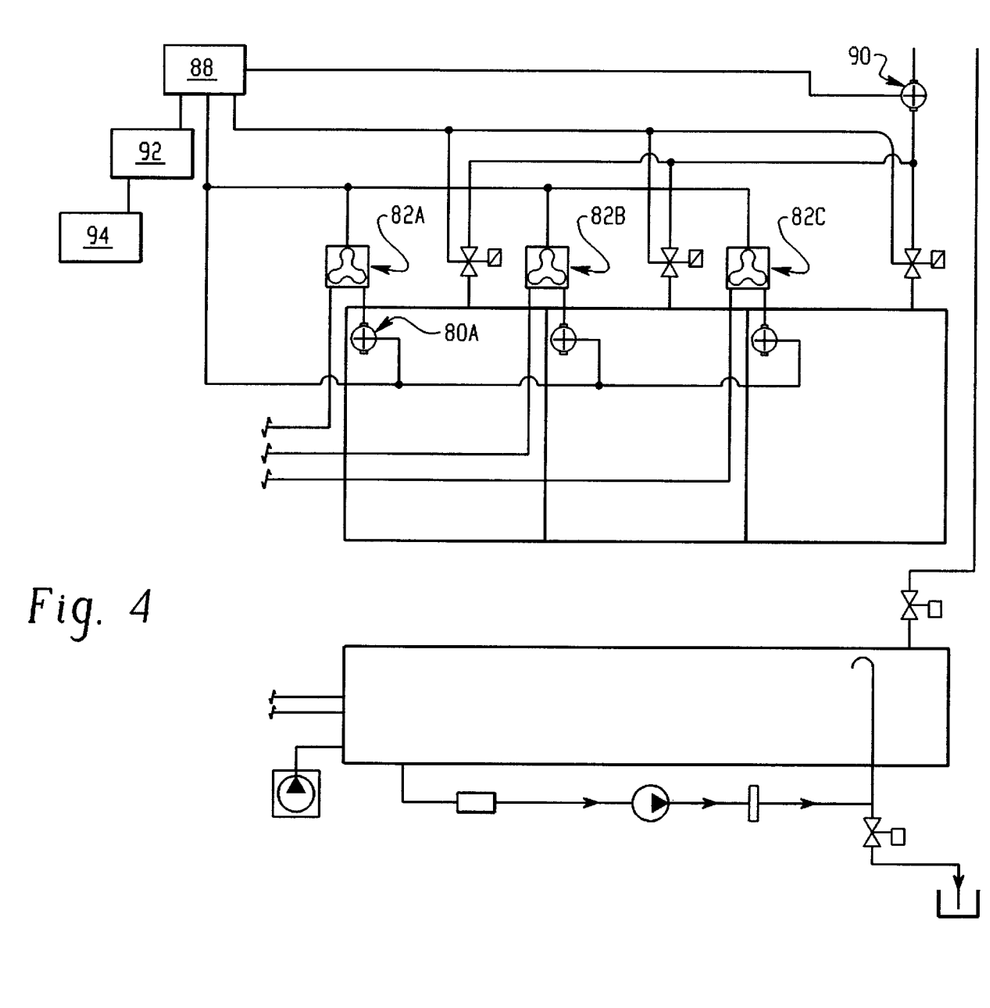
FIG. 4 is an expanded side view of the vertical filtration device of FIG. 1.

With continuing reference to FIGS. 1 and 3 and further reference to FIG. 4 a control circuit 88 optionally regulates the amount of detergent and the volume of water added to the tank 12 to replenish the cleaning fluid. A water flow meter 90 detects the volume of water entering the tank. The control circuit monitors the volume of water and addresses a look-up table 92. The look-up table determines the amount of detergent to be added. The control circuit signals the peristaltic pump 82 to deliver a corresponding number of detergent pulses. The amount to be added is dependent on such factors as the type of washing cycle, the type and concentration of the detergent, the level of soil on the load, and the proportion of cleaning fluid reused.

The flow meter 80 acts as a check on the injection system 50 by indicating whether fluid is flowing into the tank 12. This insures that the detergent is being delivered to the tank 12. In the event that the detergent in the container 84 is consumed, or blockages occur in the system, the flow meter 80 registers this as a decrease in the measured flow or an absence of flow. Optionally the flowmeter 80 is linked to an alarm system 94 which alerts the operator to the insufficiency in the detergent flow.

Optionally, the alkaline and acid detergents in the supply containers 84A and C are used to balance the pH of the waste fluid in the cool-down vessel 40. Cool down supply lines 96A and B carry the detergent to the cool-down vessel 40. Acid and alkaline neutralizer pumps 98A and 98B, respectively, control the flow of detergent to the cool-down vessel 40.

Figure 5:
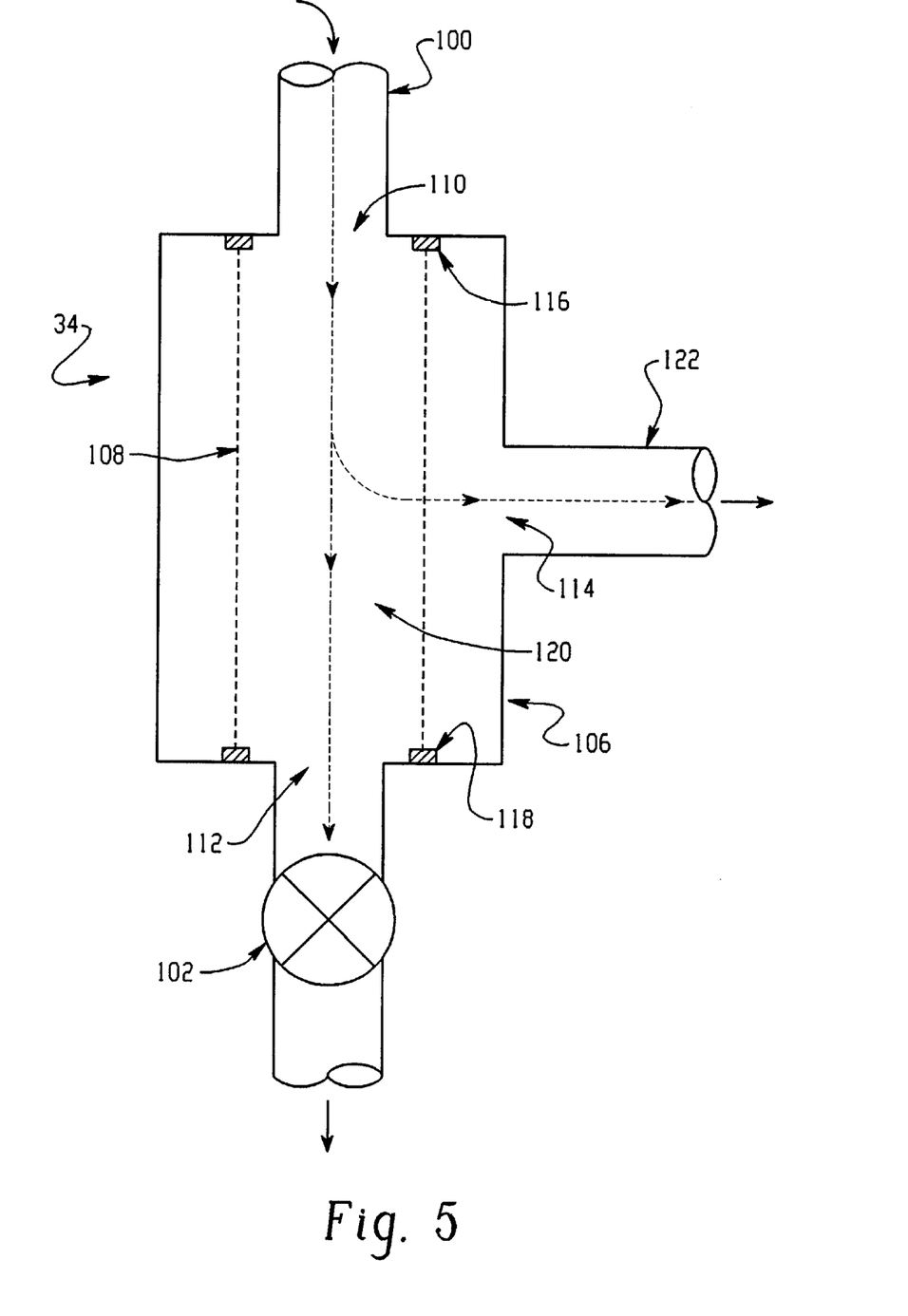
FIG. 5 a schematic side sectional view of the vertical filtration device of FIG. 1.

With reference to FIGS. 1 and 5, the self cleaning filter or vertical filtration device 34 filters used cleaning fluid for reuse. The filter 34 reduces down-time of the washer by periodic self cleaning of the filter during portions of the cleaning cycle when the filter is not being employed for filtering the used cleaning fluid collected in the sump 30. In a typical cleaning cycle, the sump pump 32 delivers the used fluid to the self cleaning filter through a used fluid line 100. The used fluid is recycled by passing the fluid through the filter 34 and returning the filtered cleaning fluid to the tank 12. To maintain cleaning efficiency, however, a portion of the used fluid is discarded, to be replaced by fresh cleaning fluid. The fluid to be discarded is used to clean the filter of suspended material such as soil and dirt that collects in the filter during filtration of the cleaning fluid. A filtration valve 102 selectively opens to direct fluid from the filter 34 through a spent fluid line 104 to the drain 36. The filter 34 is cleaned automatically by the portion of the used cleaning fluid that is directed through the filter to the drain 36.

The filter 34 includes a filtration chamber 106 and a filtration screen 108, disposed within the filtration chamber. The filtration chamber includes a fluid inlet 110, a lower or first fluid outlet 112, and second, or side fluid outlet 114. The filtration screen 108 preferably defines a cylinder. First and second annular gaskets, such as upper gasket 116 and lower gasket 118, respectively, seal the cylindrical screen 108 at its open ends around upper inlet 110 and lower outlet 112. The filtration screen thereby surrounds a central region 120 of the filtration chamber.

Used cleaning fluid enters the central region 120 of the filtration chamber 106 through upper inlet 110. When the filtration valve 102 is closed, the cleaning fluid passes through the screen 108. The screen preferably comprises a mesh, such as a stainless steel mesh, the mesh size selected to trap soil and other suspended particles within the central region, while not unduly limiting the flow rate of the cleaning fluid through the filter 34. The filtered used cleaning fluid exits the filtration chamber 106 through side outlet 114. A recycled fluid line 122 is connected to the side outlet. The recycled fluid line returns the filtered cleaning fluid to the cleaning fluid tank 12.

When the filtration valve 102 is open, the majority of the cleaning fluid passes straight through the central region 120 of the filtration chamber 106. As it does so, it collects soil and other dirt trapped by the screen 108, leaving the screen and central region free of accumulated soil and other particulates and ready to filter subsequent additions of cleaning fluid when the filtration valve is again closed.

Cleaning the filter 34 in this way reduces operating costs by using waste cleaning fluid rather than fresh water to remove accumulated particles from the filter. Further, by cleaning the filter during the cycle, considerable time is saved because the operation of the washer 1 is not halted to allow for separate cleaning.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A washer comprising:
    a stationary, walk-in washing chamber having a floor, items to be washed in the chamber being wheeled onto the washing chamber floor;
    spray nozzles disposed in the washing chamber to spray a cleaning fluid over a load to be cleaned;
    a sump below the floor of the washing chamber which collects the cleaning fluid sprayed over the load, the sump being a shallow sump, of less than 12 cm in depth;
    a self priming sump pump external to the sump which operates at a low head of fluid to pump at least 250 l/min of cleaning fluid from the sump;
    a dip tube which runs between the sump and the sump pump, the sump having a sloping floor which directs the cleaning fluid collected in the sump to the dip tube;
    a cleaning fluid reservoir;
    a high pressure pump for pumping at least 250 l/min of cleaning fluid from the cleaning fluid reservoir to the spray nozzles;
    a temperature booster which raises the temperature of the cleaning fluid from the cleaning fluid reservoir to a preselected wash temperature before the cleaning fluid is delivered to the spray nozzles; and
    a fluid injection system connected with the cleaning fluid reservoir for accurately delivering a preselected quantity of a concentrated cleaning fluid to the cleaning fluid reservoir.

2. The washer of claim 1 wherein the high pressure pump delivers cleaning fluid to the spray nozzles at a pressure of about 5 to 15 bar.

3. The washer of claim 2 wherein the cleaning fluid has a flow rate of about 250 l/min.

4. The washer of claim 1, wherein the high pressure pump delivers cleaning fluid to the spray nozzles at a pressure of 7–9 bar.

5. The washer of claim 1 wherein the sump pump is a self-priming pump that operates at a low head of fluid.

6. The washer of claim 1 wherein the sump pump pumps cleaning fluid to the cleaning fluid reservoir.

7. The washer of claim 1 further including:
    a detergent injection system which injects detergent into the cleaning fluid reservoir, the detergent injection system including a supply of detergent and a metering pump.

8. The washer of claim 1, further including a detergent injection system which injects detergent into the cleaning fluid reservoir, the detergent injection system including:
    a supply of detergent and a metering pump;
    a flow meter, the flow meter detecting detergent flow in the detergent injection system; and
    an alarm which indicates when detergent flow through the flow meter drops below a preselected level.

9. The washer of claim 8, further including:
    a water flow meter for metering water added to the cleaning fluid reservoir; and
    a control circuit to cause the metering pump to meter an amount of detergent into the reservoir in proportion to the water added.

10. The washer of claim 9 wherein the controller determines the amount of detergent to be added by the peristaltic pump as a function of a predetermined factor input to the controller, the factor being selected from a group including:
    detergent concentration, level of soil on the load, type of detergent, proportion of cleaning fluid reused, and type of cycle.

11. The washer of claim 8, wherein the metering pump delivers a number of pulses of detergent to the cleaning fluid tank, the number of pulses determined by an amount of detergent to be added.

12. The washer of claim 1 further including an in-line temperature booster which raises the temperature of the cleaning fluid from the cleaning fluid reservoir to a preselected wash temperature shortly before the cleaning fluid is delivered to the spray nozzles,
    whereby heating the cleaning fluid in the sump is avoided.

13. The fluid injection system of claim 1, further including a peristaltic pump which delivers pulses of the fluid, the preselected quantity of concentrated cleaning fluid measured in terms of a number of the pulses of fluid delivered by the peristaltic pump.

14. The fluid injection system of claim 1, the injection system further including an alarm, the alarm indicating when the flow meter detects a fluid flow below a preselected level.

15. The washer of claim 1, further including:
    a vertical traveler including:
        a pair of counterbalanced spray arms, disposed adjacent opposite sides of the washing chamber, the spray nozzles disposed on the spray arms,
        a mechanism which supports the spray arms for vertical travel of the spray arms,
        a drive system which alternately raises and lowers the spray arms, the drive system including a drive cable,
        a break-away connection between the drive cable and the mechanism for disconnecting the cable from the mechanism, and
        a safety cable connected to the mechanism which prevents the pair of spray arms from simultaneously moving in a downward direction.

16. A washer comprising:
    a washing chamber;
    spray nozzles disposed in the washing chamber to spray a cleaning fluid over a load to be cleaned;
    a pump for pumping cleaning fluid to the spray nozzles;
    a sump which collects the sprayed cleaning fluid;
    a sump pump which pumps the cleaning fluid from the sump;
    a vertical traveler including:
        a pair of counterbalanced spray arms, disposed adjacent opposite sides of the washing chamber, the spray nozzles disposed on the spray arms,
        a mechanism which supports the spray arms for vertical travel of the spray arms, and
        a drive system which alternately raises and lowers the spray arms the drive system including:
            a drive cable, and
            a drive means engaging the drive cable and sequentially moving the cable alternately a preselected distance in a first direction and an equivalent distance in a second direction, the second direction being the reverse of the first direction, the drive cable connected to the mechanism, the cable defining a path from the drive means to each of the pair of spray arms in turn and then to the drive means;

whereby the alternating movement of the cable causes first and second spray arms to travel vertically in opposite directions.

17. The washer of claim 16 wherein the drive means includes a rodless pneumatic pump.

18. A washer comprising:

a washing chamber;

spray nozzles disposed in the washing chamber to spray a cleaning fluid over a load to be cleaned;

a pump for pumping cleaning fluid to the spray nozzles;

a vertical traveler including:
  a pair of counterbalanced spray arms, disposed adjacent opposite sides of the washing chamber, the spray nozzles disposed on the spray arms,
  a mechanism which supports the spray arms for vertical travel of the spray arms, and
  a drive system which alternately raises and lowers the spray arms, the drive system including a drive cable,
  a break-away connection between the drive cable and the mechanism for disconnecting the cable from the mechanism, and
  a safety cable connected to the mechanism which prevents the pair of spray arms from simultaneously moving in a downward direction.

19. A washer comprising:

a washing chamber;

spray nozzles disposed in the washing chamber to spray a cleaning fluid over a load to be cleaned;

a sump at the bottom of the washing chamber which collects the cleaning fluid shaved over the load;

a sump pump which pumps cleaning fluid from the sump;

a cleaning fluid reservoir which receives cleaning fluid from the sump pump;

a fluid injection system connected with the cleaning fluid reservoir for accurately delivering a preselected quantity of a concentrated cleaning fluid to the cleaning fluid reservoir;

a high pressure pump for pumping cleaning fluid from the cleaning fluid reservoir to the spray nozzles; and an in-line temperature booster connected with a fluid flow line between the cleaning fluid reservoir and the spray nozzles which raises the temperature of the cleaning fluid from the cleaning fluid reservoir to a preselected, elevated wash temperature as the cleaning fluid is delivered to the spray nozzles.

20. A washer comprising:

a pair of counterbalanced spray arms, disposed adjacent opposite sides of the washing chamber, spray nozzles disposed on the spray arms to spray cleaning fluid over the load;

a mechanism which supports the spray arms for vertical travel of the spray arms along sides of the washing chamber;

a drive system which counter cyclically raises and lowers the spray arms such that one arm is raised as the other arm is lowered;

a sump at the bottom of the washing chamber which collects the cleaning fluid sprayed over the load;

a sump pump which pumps cleaning fluid from the sump;

a cleaning fluid reservoir;

a high pressure pump for pumping cleaning fluid from the cleaning fluid reservoir to the spray nozzles; and a fluid injection system connected with the cleaning fluid reservoir for accurately delivering a preselected quantity of a concentrated cleaning fluid to the cleaning fluid reservoir.

21. A washer comprising:

a washing chamber;

spray nozzles disposed in the washing chamber to spray a cleaning fluid over a load to be cleaned;

a sump at the bottom of the washing chamber which collects the cleaning fluid that has been sprayed over the load;

a sump pump which pumps cleaning fluid from the sump;

a cleaning fluid reservoir;

a high pressure pump for pumping cleaning fluid from the cleaning fluid reservoir to the spray nozzles; and a vertical traveler including:
  a pair of counterbalanced spray arms, disposed adjacent opposite sides of the washing chamber, the spray nozzles disposed on the spray arms,
  a mechanism which supports the spray arms for vertical travel, and
  a drive system which alternately raises and lowers the spray arms, the drive system including:
    a drive cable, and
    a drive means engaging the drive cable and sequentially moving the cable alternately a preselected distance in a first direction and an equivalent distance in a second direction, the second direction being the reverse of the first direction,
    the drive cable connected to the mechanism, the cable defining a path from the drive means to each of the pair of spray arms in turn and then to the drive means;

whereby the alternating movement of the cable causes first and second spray arms to travel vertically in opposite directions.

22. A washer comprising:

a washing chamber;

spray nozzles disposed in the washing chamber to spray a cleaning fluid over a load to be cleaned;

a sump at the bottom of the washing chamber which collects the cleaning fluid sprayed over the load;

a sump pump which pumps cleaning fluid from the sump;

a cleaning fluid reservoir;

a high pressure pump for pumping cleaning fluid from the cleaning fluid reservoir to the spray nozzles; and a vertical filtration device which selectively filters cleaning fluid drawn from the sump and uses a portion of the cleaning fluid to clean the filtration device of suspended material removed from the cleaning fluid by the filter filtration device, the filtration device including:
  a chamber, and
  a filtration screen within the chamber which filters suspended material from the cleaning fluid, the filtration screen being vertically aligned such that the portion of the cleaning fluid used to clean the filtration device enters the filtration device above the filtration screen, contacts the filtration screen, and leaves the filtration device below the filtration screen.

23. The washer of claim 22 wherein the filtration device further includes:
- a fluid inlet defined in a wall of the chamber which receives cleaning fluid drawn from the sump;
- a first fluid outlet defined in a wall of the chamber which directs unfiltered cleaning fluid from the filtration device to a drain;
- a valve which selectively closes to prevent cleaning fluid from exiting the filtration device through the first fluid outlet; and
- a second ruled outlet defined in a wall of the chamber which directs cleaning fluid, filtered of suspended material by the screen, to the cleaning fluid reservoir.

24. The washer of claim 23, wherein the screen defines a cylinder and is disposed in the filtration chamber with open ends of the cylinder surrounding the fluid inlet and the first outlet respectively, the filtration device further including:
- first and second gaskets disposed around the open ends to seal the screen to the filtration chamber.

* * * * *